J. E. CARROLL.
MATURING PROCESS AND APPARATUS THEREFOR.
APPLICATION FILED NOV. 7, 1908.
968,832.
Patented Aug. 30, 1910.
2 SHEETS—SHEET 1.
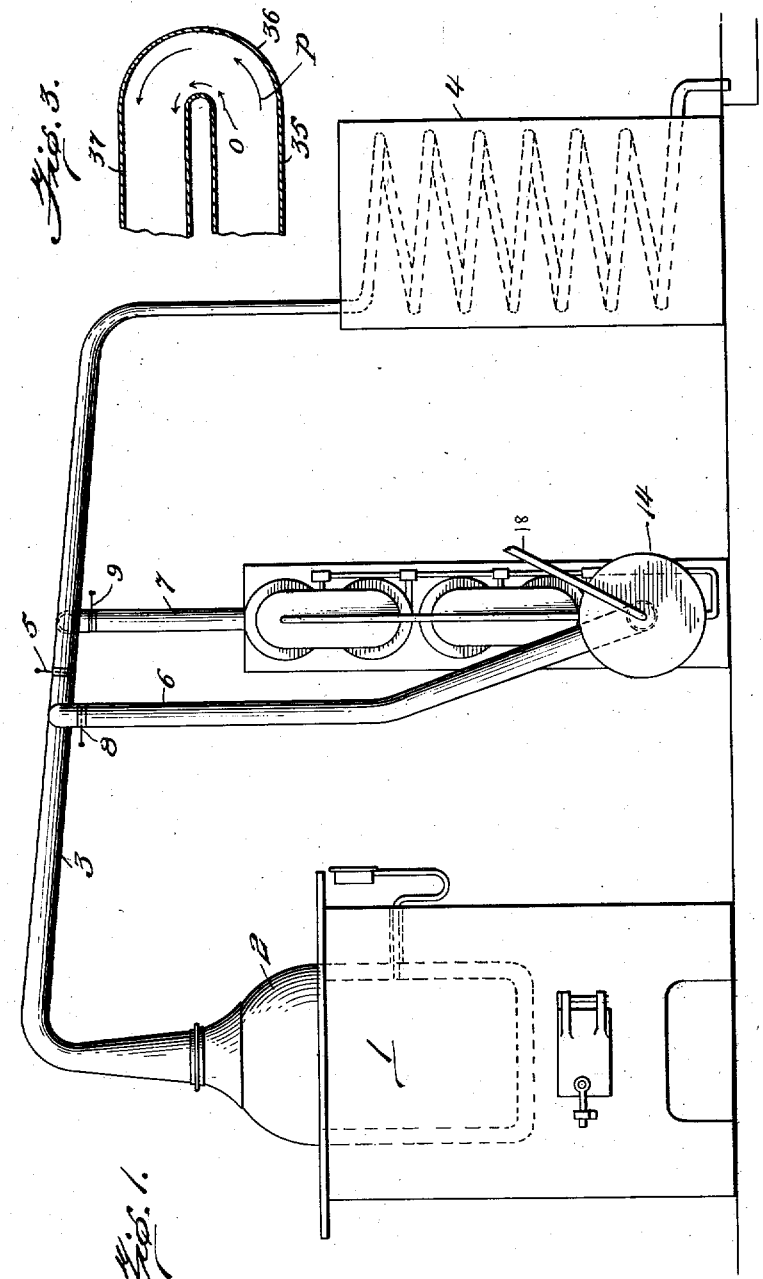
Witnesses
O. M. Offutt
A. M. Houghton
Inventor
James E. Carroll
By E. M. Marble
Attorney J. E. CARROLL.
MATURING PROCESS AND APPARATUS THEREFOR.
APPLICATION FILED NOV. 7, 1908.
968,832.
Patented Aug. 30, 1910.
2 SHEETS—SHEET 2.
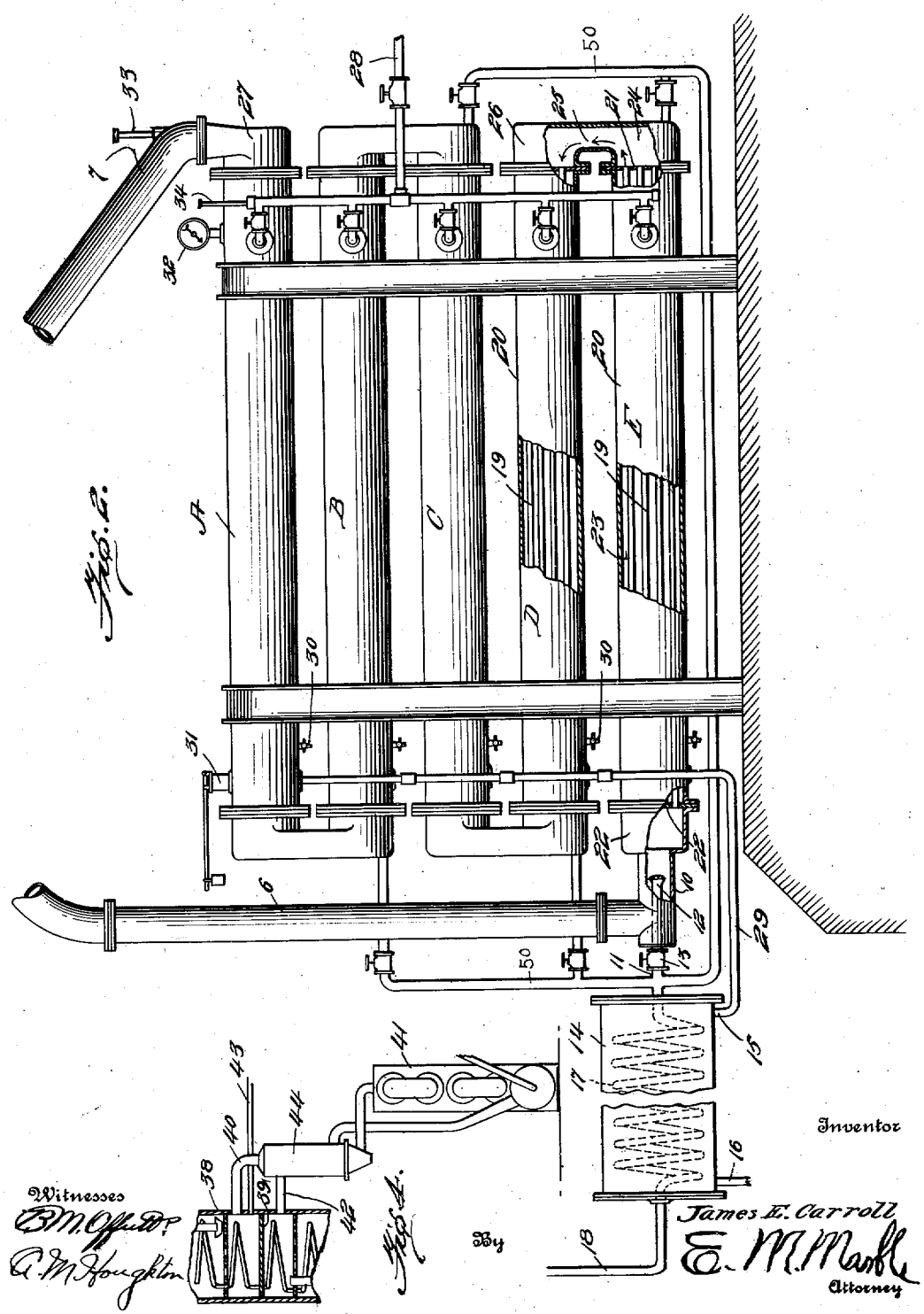
Witnesses
B. M. Offutt
G. M. Houghton
Inventor
James E. Carroll
By E. M. Marble
Attorney

UNITED STATES PATENT OFFICE.

JAMES EDMUND CARROLL, OF LONDON, ENGLAND.

MATURING PROCESS AND APPARATUS THEREFOR.

968,832.  Specification of Letters Patent.  Patented Aug. 30, 1910.

Application filed November 7, 1908. Serial No. 461,578.

*To all whom it may concern:*

Be it known that I, JAMES EDMUND CARROLL, a citizen of the United States, residing at London, England, have invented certain new and useful Improvements in Maturing Processes and Apparatus Therefor, of which the following is a specification.

This invention relates to maturing processes and apparatus therefor; and it comprises a method of maturing or "aging" whisky and similar distilled spirits wherein alcoholic vapors coming from a still, and preferably in a certain stage of the distillation, are commingled with heated air and exposed to the action of heat under repeated commingling and under effective contact with catalytically-acting hot metallic walls; and it also comprises an apparatus for maturing and aging distilled spirits which comprises means for producing distilled alcoholic vapors, means for mixing air with said vapors, means for repeatedly mingling said air and vapors, and means for exposing the mixture to the action of heated catalytically-acting walls and in intimate contact with such walls, all portions of such mixture coming into contact with such walls; all as more fully hereinafter set forth and as claimed.

In the usual methods of making whisky, rum and other distilled liquors, the distillate from the fermented mash is ordinarily stored for a long period of time, usually a number of years, in order to mature or age it. The storage is usually in oaken barrels. During the storage, the liquor undergoes a number of changes of obscure nature which result in rendering it palatable and potable whereas the crude condensate from the stills is hardly drinkable, having a "harsh, new" flavor. Whisky aged in wood has a "mellow" flavor. While the nature of the changes is, as stated, obscure, they are apparently due in some way to oxidation, air penetrating more or less into the barrels in which the aging or maturing is done, and in some manner developing taste and aroma producing ethers or esters, or, probably, both.

In the prior art many methods of performing a quick oxidation have been attempted; this being generally done by aerating the liquor during storage. Such aerating processes however, in spite of their close imitation of the natural maturing processes, have hardly proved satisfactory in giving the desired results within any reasonable time, oxidation at comparatively low temperatures, such as must of course be used with alcoholic liquids, being a slow operation and also somewhat uncertain, since the taste and aroma produced in this way are not always of the most desirable type. In a prior process, (Patent No. 666,242) I have departed from this method of maturing by aerating the heated vapors in lieu of the condensed liquid and have thereby secured much more uniform, speedy and desirable results. In the present process I have still further improved this method by regulating the nature and extent of the reaction between the air and the vapors by controlling certain conditions. I have discovered that the said reaction is not merely a matter of heat alone but is, like other chemical reactions, much affected by the nature of the vessels in which it is performed and particularly by what is known as "wall action;" and that by bringing the mixture of air and vapors into very intimate and thorough contact with catalytically-acting heated metal walls while preserving a definite range of temperatures, a highly desirable type of action takes place, giving matured liquors of exceptional mellowness. This contact of the air-vapor mixture with the wall surface must be positive in its nature, every portion of such mixture coming into such contact. In any large body of mixed air and alcohol vapor it is, however, very difficult to secure such an intimate contact of every particle of such body with the walls, owing partly to the difficulty in overcoming stratification in such a heterogeneous mixture if of any large volume and partly to the sheer difficulty of securing circulation. The specific gravity of alcohol vapor and air differs very widely. These difficulties increase more than proportionately with an increase in volume, and they persist even where the body of gas is converted into a flowing current, as in a large-diameter pipe; and particularly where the pipe is heated, since the heating tends to preserve the stratification. Practically, it may be said that with any flowing current of gas or vapor over an inch or so in diameter, it is difficult to insure any perfect mixture so that every portion of the current of such mixture shall come into actual contact with the materials of the conduit wall in any reasonable length of travel. In catalyzing a mixture of spirit vapor and air, such perfect mixture and actual contact are, however, as I find, imperatively necessary for the best results. Any portion of the air-vapor mixture which has not come into contact with the conduit walls, even if heated to whatever temperature is employed in maturing, is apt to be insufficiently matured and upon condensation and admixture with the rest of the matured material will depreciate its quality.

In the present invention, therefore, I take the stream of vapor flowing from the head of an ordinary pot-still, admix it with air and then subdivide the mixture into a plurality of relatively small streams, each of comparatively small diameter, and pass these streams through separate heated pipes, each of corresponding diameter. And still further to reduce the danger of stratification which might lead these streams, drawn from a body of mixed air and vapor, to be of different composition, I preferably use the air in a heated state. Cold air and heated vapor are difficult to mix uniformly while hot air mixes well. And with heated air, the heating duty of the heated conduits is of course reduced. Furthermore, after the separate streams have traveled through their respective heated conduits for a time, I preferably remix them and again subdivide into separate streams. Such re-commingling from time to time is very advantageous. In the present process it is desirable that every molecule, so to speak, of the vapor shall have a molecule of oxygen lying next it and that these adjacent molecules shall at some time in their travel through the apparatus come into contact with a heated metallic wall. In securing this commingling, it is desirable that the direction of flow through the conduits be reversed at each commingling. If a two-stratum layer of gas travel through a conduit to the right, emerge into an end chamber and thence travel through another conduit to the left, the upper and lower strata tend to be reversed; an effect which much promotes commingling.

The metal of the conduits used in the present invention is preferably copper as it combines a good resistance against the action of the air-vapor mixture with an efficient catalyzing action for the present purposes.

The temperature employed in the catalyzing operation is of considerable importance. While there is a certain range of temperatures for each particular distilled liquor, a temperature of about 300° F. is well adapted for most. In manufacturing Scotch whisky, for example, an average temperature of about 300° F. is quite suitable. The temperature should not fall below 280° F. or rise above 320°. Below the first temperature, the maturing action is slow and inefficient; above the latter temperature the characteristic malt flavor of the whisky tends to disappear.

It is further desirable in the present process that the whole body of vapors be not sent through the maturing apparatus, but that both the forerunnings and the after runnings be by-pressed around it, leaving merely the intermediate portion to be treated. With both these fractions, oxidation under the described conditions is apt to be too active.

In the accompanying illustration, I have shown, more or less diagrammatically, certain embodiments of apparatus elements useful in performing the described process and in other relations.

In this showing Figure 1 is a view in elevation showing, more or less diagrammatically, an ordinary pot still and condenser and maturing apparatus connected therewith; Fig. 2 is a view of the maturing apparatus, partly broken away; Fig. 3 is a detail view showing the reversal of vapor strata in reversing the direction of flow; and Fig. 4 is a view showing the maturing apparatus in connection with a column still.

In Fig. 1, element 1 is an ordinary pot still, provided with the usual head 2. From the head, conduit 3 leads vapor away to a condenser (shown as an ordinary worm condenser) 4. In the vapor conduit is a valve, 5, and tapping the conduit on either side of this valve are two vapor lines, 6 and 7, valved respectively at 8 and 9. The vapor line nearer the still leads vapors to the maturing apparatus proper while the other returns the treated vapor to the vapor conduit.

Vapor line 6, as shown, leads downward to the mixing chamber 10. Entering this chamber is an air pipe 11, ending in a rose or other distributer, 12, therewithin, and valved at 13. This air pipe derives heated air from heater 14, shown as a simple casing having steam inlet 15 and outlet 16, containing a helical air pipe 17, supplied by pipe 18 from a fan or blower (not shown). The mixture of air and vapor is treated in a series of superheaters (five are shown), lettered respectively A, B, C, D and E, and like in structure. Each superheater contains a nest of tubes, 19, preferably not over an inch in diameter, contained in a heating casing, 20, provided with a cross-header at each end, respectively 21 and 22. These headers form mixing chambers at either end with an intermediate steam chamber, 23. The mixing chamber at the entrance end of the lowermost casing has already been described. The mixture of vapor and heated air in this chamber is sub-divided into as many small streams as there are tubes and the streams from these tubes are again intermingled at the mixing chamber 24 at the other end of the superheater. This latter chamber is provided with an uptake 25 connected with the mixing chamber 26 next in series, and so on throughout the series. The mixing chamber 27 at the exit end of the uppermost superheater (A) is connected with the return vapor line (7).

The steam chambers of the various superheaters are fed by steam line 28 and exhausted by outlet line 29. As shown, 29 supplies exhaust steam for the air heater. Each superheater is provided with a petcock, 30, for removing entrapped air or gas. The apparatus is further provided with safety valve 31, pressure gage 32, thermometer 33 in the return vapor line, and pyrometer 34 in the steam line.

In Fig. 3, which is a mere diagrammatic view to show reversal of vapor strata, strata $o$ and $p$ leaving a pipe 35 and flowing upward through an end chamber 36 and thence backward through another pipe 37, tend to reverse in position as shown. In the actual apparatus of Figs. 1 and 2, which have a plurality of tubes, the mixing action is much more complicated, but this view shows it in a simplified form.

In Fig. 4, 38 shows, diagrammatically, a broken away section of an ordinary column still, interrupted by a transverse partition 39. Above this partition, enters pipe 40 returning vapors from diagrammatically shown superheater 41 while below it pipe 42 abstracts alcohol vapors and delivers the same to said superheater. The column still is, preferably, a rectifying column, such as is used with the ordinary types of "Coffey still." When used as such, concentrated, purified alcohol may be removed from the apparatus above the diaphragm by pipe 43. An ordinary heat-interchanger 44 may be interposed in the communication between still and superheater to insure return of the superheated vapors to the still at still temperature.

The operation of the devices shown is apparent from the foregoing. In Figs. 1 and 2, valve 5 may be opened while the first portion of distillate is coming from the still, valves 8 and 9 being closed, and this distillate is thereby by-passed around the maturing apparatus and delivered to the condenser. When tolerably pure alcoholic vapor appears, the valve 5 is closed and 8 and 9 opened, whereby the alcoholic vapors are led through the maturing device. The alcoholic vapors are admixed with heated air in 10 and the mixture passes onward as a plurality of relatively narrow streams through the several tubes of the tube nest, being heated by the steam in the steam chamber. The mixture, for Scotch whisky, is preferably kept at a temperature around 300° F. Steam of 500° to 700° F., expanded to only 7 or 8 pounds pressure, may be used in the heating jacket. The mixture of air and vapor being passed through these narrow tubes substantially all portions of the mixture come into actual contact with the tube walls. Emerging from the first tube nest, the mixture passes into the mixing chamber at the other end of the superheater and is thoroughly commingled therein, the reversing tendency of the change of direction of flow materially aiding in this commingling. The mixed body in this mixing chamber is again subdivided into a plurality of narrow streams in the second superheater (D) and so on through the series. When the alcoholic vapors coming from the still become less pure, it is preferable to by-pass them around the superheater, thus confining the maturing action to the purer midportion of the distillate.

In using the apparatus of Fig. 4, 38 is preferably a rectifying still, separating fusel oil and aldehyde from the alcohol so that the vapors taken to the maturer by 42 and returned by 40 are substantially pure alcohol. In another and co-pending application Ser. No. 469,318, filed Dec. 26, 1908, I have described more specifically an apparatus of this type and have claimed such apparatus and a process of improving the quality of concentrated alcohol vapors wherein such apparatus is employed.

If preferred, the aeration in the maturing apparatus may be done at a plurality of points. Valved connection 50 permits air in regulated amount to be supplied to any of the mixing chambers.

In the manufacture of Scotch whisky by the described process, the distillate coming from the condenser has the taste, odor and chemical characteristics of whisky which has been matured for a long time in wood and is devoid of the ordinary harsh, new flavor of new whisky. Similar advantages are attained in the case of other distilled liquors. Distilled liquors so produced may be sent into the market directly and do not require maturing, being, as a matter of fact, indistinguishable in most cases from spirits which have matured for several years where the operation has been conducted with the precautions previously described.

What I claim is:—

1. The process of preparing a matured potable liquor which comprises producing alcoholic vapors in a pot still, admixing the vapors from the still with heated air to form a mixed body, subdividing the mixture into a plurality of relatively narrow streams and passing such streams past and in substantial contact with heated metal walls, said streams being remingled at a plurality of points in their course and condensing the treated vapors to form a matured potable liquor.

2. The process of preparing a matured potable liquor which comprises producing alcoholic vapors in a pot still, admixing the vapors from the still with air to form a mixed body, subdividing the mixture into a plurality of relatively narrow streams and passing such streams past and in substantial contact with heated metal walls, said streams being remingled at a plurality of points in their course and condensing the treated vapors to form a matured potable liquor.

3. The process of preparing a matured potable liquor which comprises producing alcoholic vapors in a pot still, admixing the vapors from the still with air to form a mixed body, subdividing this body to form a plurality of relatively narrow streams and passing such streams past and in substantial contact with heated metal walls, remingling the streams to form another united body, resubdividing into narrow streams and once more passing such streams past and in substantial contact with heated metal walls and condensing the treated vapors to form a matured potable liquor.

4. The process of treating alcoholic vapors which comprises mixing alcoholic vapors with heated air and transmitting said admixed vapors and air as a relatively narrow stream through a metal conduit maintained at a temperature of about 300° F., no portion of said stream being more than half an inch from a heated metal wall.

5. In the treatment of alcoholic vapors, the process which comprises producing alcoholic vapors in a still relatively free from higher and lower boiling spirituous impurities, admixing the vapors coming from the still with air to produce a mixed body, subdividing this body into a plurality of relatively narrow streams and passing such streams past and in substantial contact with heated metal walls, remingling the streams to form another mixed body and once more subdividing such mixed body into a plurality of relatively narrow streams and passing such streams past and in substantial contact with heated metal walls.

6. In a maturing apparatus, a pot still serving as a source of alcoholic vapors, means for admixing such vapors with heated air to form a mixed body, and means for transmitting such mixed body in a plurality of relatively narrow streams past and in substantial contact with heated metal walls, means for remingling said streams and means for condensing the vapors treated.

7. In a maturing apparatus, the combination with a still serving as a source of alcoholic vapors of a maturing apparatus comprising means for mixing such vapors with heated air to form a mixed body, means for subdividing such mixed body into a plurality of relatively narrow streams and transmitting such streams past and in substantial contact with heated metal walls, means for reuniting the several streams and commingling them, and means for once more subdividing them into relatively narrow streams and transmitting them past and in substantial contact with heated metal walls.

8. The process of producing a matured spirit which comprises distilling fermented spirits from a still, rejecting the first and last portions of the vapors, mixing the mid portions with heated air to form a mixed body, subdividing this body into a plurality of relatively narrow streams, each not exceeding an inch in diameter, and passing such streams in actual contact with superheated metal walls, and after reaction has taken place condensing the matured spirit from the vapor mixture.

9. The process of maturing vapors, which comprises admixing the comparatively large volume stream of vapors coming from an ordinary alcohol still with heated air, subdividing such admixed stream into a plurality of relatively narrow streams and passing each such narrow stream past and in substantial contact with heated metal walls, said streams being positively remingled and again subdivided at a plurality of points in their course.

In testimony whereof I affix my signature, in presence of two witnesses.

JAMES EDMUND CARROLL.

Witnesses:
JOHN H. SIGGERS,
LEWIS EBERLY.

---

It is hereby certified that in Letters Patent No. 968,832, granted August 30, 1910, upon the application of James Edmund Carroll, of London, England, for an improvement in "Maturing Processes and Apparatus Therefor," an error appears in the printed specification requiring correction as follows: Page 2, line 72, the compound word "by-pressed" should read *by-passed;* and that the said Letters Patent should be read with this correction therein that the same may conform to the record of the case in the Patent Office.

Signed and sealed this 27th day of September, A. D., 1910.

[SEAL.]

C. C. BILLINGS,

*Acting Commissioner of Patents.* mixed body, subdividing the mixture into a plurality of relatively narrow streams and passing such streams past and in substantial contact with heated metal walls, said streams being remingled at a plurality of points in their course and condensing the treated vapors to form a matured potable liquor.

3. The process of preparing a matured potable liquor which comprises producing alcoholic vapors in a pot still, admixing the vapors from the still with air to form a mixed body, subdividing this body to form a plurality of relatively narrow streams and passing such streams past and in substantial contact with heated metal walls, remingling the streams to form another united body, resubdividing into narrow streams and once more passing such streams past and in substantial contact with heated metal walls and condensing the treated vapors to form a matured potable liquor.

4. The process of treating alcoholic vapors which comprises mixing alcoholic vapors with heated air and transmitting said admixed vapors and air as a relatively narrow stream through a metal conduit maintained at a temperature of about 300° F., no portion of said stream being more than half an inch from a heated metal wall.

5. In the treatment of alcoholic vapors, the process which comprises producing alcoholic vapors in a still relatively free from higher and lower boiling spirituous impurities, admixing the vapors coming from the still with air to produce a mixed body, subdividing this body into a plurality of relatively narrow streams and passing such streams past and in substantial contact with heated metal walls, remingling the streams to form another mixed body and once more subdividing such mixed body into a plurality of relatively narrow streams and passing such streams past and in substantial contact with heated metal walls.

6. In a maturing apparatus, a pot still serving as a source of alcoholic vapors, means for admixing such vapors with heated air to form a mixed body, and means for transmitting such mixed body in a plurality of relatively narrow streams past and in substantial contact with heated metal walls, means for remingling said streams and means for condensing the vapors treated.

7. In a maturing apparatus, the combination with a still serving as a source of alcoholic vapors of a maturing apparatus comprising means for mixing such vapors with heated air to form a mixed body, means for subdividing such mixed body into a plurality of relatively narrow streams and transmitting such streams past and in substantial contact with heated metal walls, means for reuniting the several streams and commingling them, and means for once more subdividing them into relatively narrow streams and transmitting them past and in substantial contact with heated metal walls.

8. The process of producing a matured spirit which comprises distilling fermented spirits from a still, rejecting the first and last portions of the vapors, mixing the mid portions with heated air to form a mixed body, subdividing this body into a plurality of relatively narrow streams, each not exceeding an inch in diameter, and passing such streams in actual contact with superheated metal walls, and after reaction has taken place condensing the matured spirit from the vapor mixture.

9. The process of maturing vapors, which comprises admixing the comparatively large volume stream of vapors coming from an ordinary alcohol still with heated air, subdividing such admixed stream into a plurality of relatively narrow streams and passing each such narrow stream past and in substantial contact with heated metal walls, said streams being positively remingled and again subdivided at a plurality of points in their course.

In testimony whereof I affix my signature, in presence of two witnesses.

JAMES EDMUND CARROLL.

Witnesses:
JOHN H. SIGGERS,
LEWIS EBERLY.

---

It is hereby certified that in Letters Patent No. 968,832, granted August 30, 1910, upon the application of James Edmund Carroll, of London, England, for an improvement in "Maturing Processes and Apparatus Therefor," an error appears in the printed specification requiring correction as follows: Page 2, line 72, the compound word "by-pressed" should read *by-passed;* and that the said Letters Patent should be read with this correction therein that the same may conform to the record of the case in the Patent Office.

Signed and sealed this 27th day of September, A. D., 1910.

[SEAL.]

C. C. BILLINGS,

*Acting Commissioner of Patents.*

It is hereby certified that in Letters Patent No. 968,832, granted August 30, 191 upon the application of James Edmund Carroll, of London, England, for an improv ment in "Maturing Processes and Apparatus Therefor," an error appears in tl printed specification requiring correction as follows: Page 2, line 72, the compoun word "by-pressed" should read *by-passed;* and that the said Letters Patent shoul be read with this correction therein that the same may conform to the record of th case in the Patent Office.

Signed and sealed this 27th day of September, A. D., 1910.

[SEAL.]

C. C. BILLINGS,

*Acting Commissioner of Patents.*